United States Patent [19]

Tohyama et al.

[11] 4,375,331
[45] Mar. 1, 1983

[54] SLIT EXPOSURE DEVICE WITH WHITE REFLECTING MEMBER

[75] Inventors: Yoshikuni Tohyama; Akihiko Katsura, both of Yokohama, Japan

[73] Assignee: Canon Kabushiki Kaisha, Tokyo, Japan

[21] Appl. No.: 156,219

[22] Filed: Jun. 3, 1980

[30] Foreign Application Priority Data

Jun. 7, 1979 [JP] Japan .................................. 54-71741

[51] Int. Cl.$^3$ ........................ G03B 15/02; G03B 27/54
[52] U.S. Cl. .......................................... 355/51; 355/8; 355/67
[58] Field of Search ...................... 355/7, 8, 11, 51, 67, 355/71

[56] References Cited

U.S. PATENT DOCUMENTS 3,982,116  9/1976  Sakuma ................................. 355/67
3,998,541 12/1976  Michaloski ........................... 355/67

FOREIGN PATENT DOCUMENTS 53-110131  9/1978  Japan .
54-36502   3/1979  Japan .

OTHER PUBLICATIONS

Research Disclosure, May 1977, No. 15765 "Edge Flashdown" Author–Michaloski.

Primary Examiner—John Gonzales
Assistant Examiner—Alan Mathews
Attorney, Agent, or Firm—Fitzpatrick, Cella, Harper & Scinto

[57] ABSTRACT

In a slit exposure scanning type copying machine or the like, a thin white member is fixedly disposed in the image forming main optical path from the vicinity of the end of an original stopping reference member or the vicinity of the end of an original carriage keep member, whereby the image forming main light beam from said vicinity of the end is not effectively transmitted to an image plane but instead, part of an illuminating light beam for illuminating an original from the opposite sides thereof is reflected by the white member, thereby forming predetermined blank spaces at the end portions of copy paper corresponding to the scanning starting end and the scanning terminating end. The white member is disposed at a predetermined angle with respect to the original by taking the scanning direction into account so that the shadow thereof imparted to the slit exposure area on the original surface does not greatly decrease the quantity of light of the illuminating light beam which contributes to image formation.

11 Claims, 14 Drawing Figures

SLIT EXPOSURE DEVICE WITH WHITE REFLECTING MEMBER

BACKGROUND OF THE INVENTION

1. Field of the Invention

This invention relates to an original exposure device in a slit exposure scanning type copying machine or the like.

2. Description of the Prior Art

In heat roller fixation type dry copying machines or the like, it is necessary to form a non-imaged, blank space at the leading end of copy paper in order to provide a better parting property of the copy paper from heat rollers. This is accomplished, for example, by forwardly shifting the timing at which the copy paper is fed to the image formation system. However, an original to be copied is usually positioned on an original carriage glass with one end thereof stopped by an original stopping reference member and, this had led to a problem that a shadow is created at the boundary between the original and the stopping portion of the original stopping reference member and such shadow appears as a black line in the leading end portion of the copy paper which should be a blank space, thus deteriorating the quality of the copy image.

Japanese Laid-Open Utility Model Application No. 110131/1978 discloses bevelling the end of the original carriage glass keep member on the original carriage glass side and white-painting such bevelled end to prevent creation of the aforementioned black line, but this method suffers from the problems that the formation of the part into a special shape involves high cost and that a thin original is pressed against the bevelled portion so that it is difficult for the original to be stably positioned.

Further, a method of providing a white member on the underside of the original carriage glass is known from Japanese Patent Publication No. 36502/1979, but this method suffers from the following problems.

FIGS. 1A and 1B to FIGS. 2A and 2B of the accompanying drawings show examples of the prior technique of preventing creation of black line. In FIG. 1A, a sheet-like white member 2 is provided on the underside of an original carriage glass 1 and this white member 2 is made longer than the fore end portion of an original stopping reference member 3 which serves also as an original carriage glass keep member, whereby during the exposure of the end portion of an original 4, the image of the white member 2 is projected to prevent a black line from appearing on copy paper. A main mirror 6 is an elliptical cylindrical plane mirror having the center of a light source 5 as the focus or a multiplane mirror comprising a plurality of plane mirrors. The image forming light from the original is reflected by a first scanning mirror 7 toward a lens. According to this method, however, the original 4 is illuminated from only one side thereof by the light source 5 and the main mirror 6 and this leads to a problem that during copying of a thick original such as an opened dictionary, a shadow is created in the opened portion of the original and a shadow by the original carriage keep member is also created at the other end of the original carriage. If, to solve such problem, a method of providing an auxiliary mirror 8 as shown in FIG. 1B and illuminating the original 4 symmetrically from two directions is adopted, the shadow of the white member 2 will be created on the original 4 by the auxiliary light from the auxiliary mirror 8 and this will cause a band-like under-exposure in the portion of copy paper which is immediately after the blank space of the leading end portion thereof, thus causing fog in such portion of the copy paper. The size of the shadow of the white member 2 depends on the thickness of the original carriage and the angle of incidence of the light from the auxiliary mirror 8 and is a considerably large size because the original carriage is usually thick, thus adversely affecting the original exposure past the boundary portion between the white member 2 and the original.

FIGS. 2A and 2B show improvements in the method of illuminating the original from two sides. As shown in FIG. 2A, during the exposure of the boundary portion between the original stopping reference member 3' and the end of the original 4, the image of the white member 2' is projected as in the case of FIG. 1B. Also, as shown in FIG. 2B, during the exposure of the end portion of the original past the boundary portion, the light beam from the auxiliary mirror 8 is intercepted by the white member 2', but in compensation therefor, the original 4 is illuminated by a fixed mirror 8' provided on the upper portion of the white member 2', thereby minimizing the fog phenomenon which results from a deficient amount of exposure. According to this method, however, during the slit exposure scanning, the light beam reflected by the auxiliary mirror 8 toward the slit area is greatly intercepted by the white member 2', and the central light ray reflected by the fixed mirror 8' toward the slit area for compensating for this varies its angle of incidence from moment to moment and therefore, in addition to the reflection factor and angle of the fixed mirror 8' itself, it is difficult to set the white member so as to prevent an excessive amount of exposure or a deficient amount of exposure in the end portion of the original.

SUMMARY OF THE INVENTION

It is an object of the present invention to provide an original exposure device of simple construction in a slit exposure scanning type copying machine or the like which, during the slit exposure scanning, prevents creation of a black line on the portion of copy paper corresponding to the boundary portion between an original and an original stopping reference member and which is easy to set and which illuminates the original from two sides.

It is another object of the present invention to provide an original exposure device which prevents a black line from being created by a shadow formed by the illuminating light on the scanning starting end side as well as on the scanning terminating end side.

Such object is achieved by fixedly disposing a band-like, thin, white member in the image forming main optical path from said boundary portion at the scanning starting end, with the scanning direction taken into account, and parallel to the direction passing through the slit area at the scanning starting end and the image position of the light source by an auxiliary mirror, and feeding copy paper in synchronism with the timing applied to this white member. By this thin white member, the influence of the shadow created in the slit area is greatly reduced as compared with the prior art. Also, the object is achieved by fixedly disposing a band-like thin white member in the image forming main optical path from that end of the original carriage keep member at the scanning terminating end and corresponding to the average angle of incidence of the illuminating light beam incident on the slit area.

The invention will become fully apparent from the following detailed description thereof taken in conjunction with the accompanying drawings.

DESCRIPTION OF THE PREFERRED EMBODIMENTS

Figure 1A:
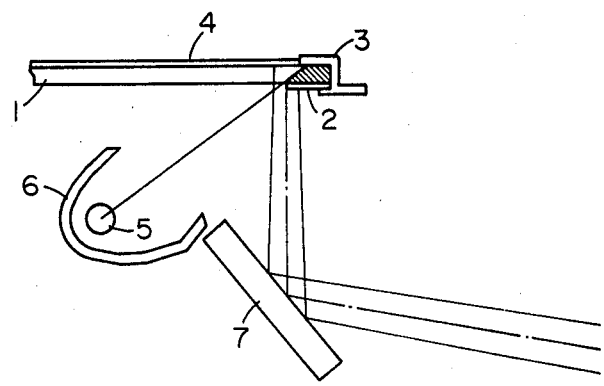
FIGS. 1A and 1B and FIGS. 2A and 2B illustrate the original exposure devices of the prior art.
Figure 1B:
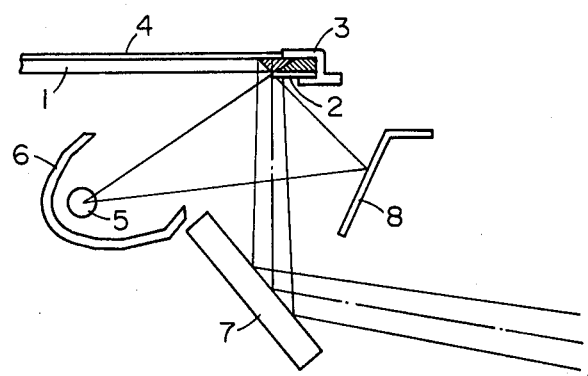
Figure 2A:
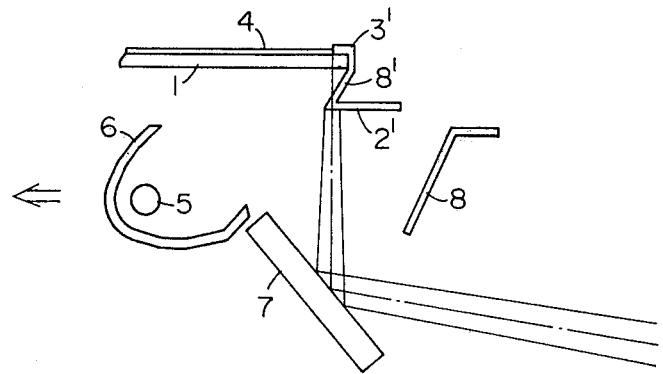
Figure 2B:
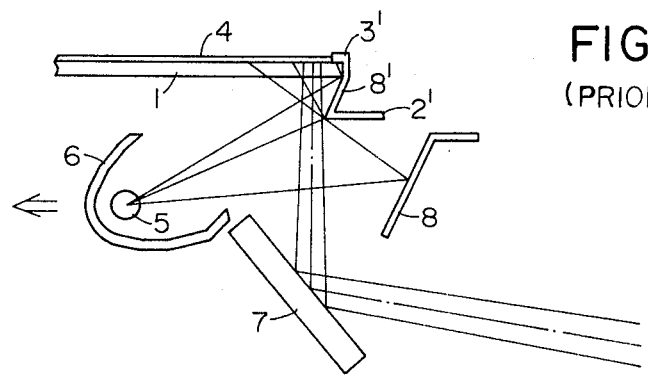
Figure 3:
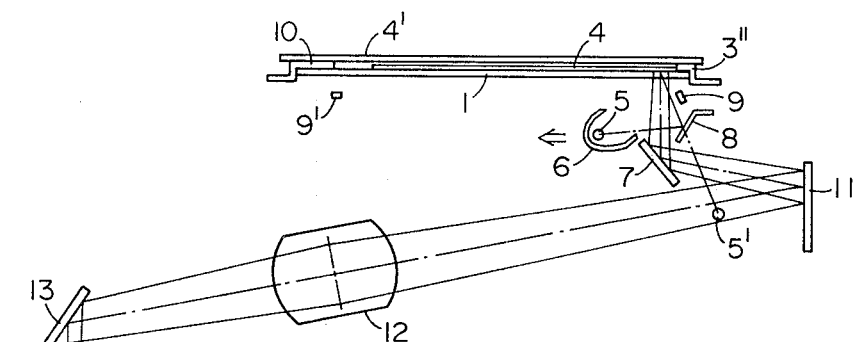
FIG. 3 illustrates a system in which the present invention is applied to a copying machine.

FIG. 3 illustrates a system in which the present invention is applied to a slit exposure scanning type copying machine. One end is an original carriage glass 1 is provided with an original stopping reference member 3" serving also as a glass keep member and the other end of the original carriage glass is provided with another glass keep member 10. An original 4 is placed on the original carriage glass 1 and positioned with one end thereof stopped by the original stopping reference member 3". The original 4 is illuminated by an illuminating light source 5, a main mirror 6 and an auxiliary mirror 8 which are movable as a unit with a first scanning mirror 7 at the same velocity in the same direction. Designated by 5' is the image of the illuminating light source 5 by the auxiliary mirror 8 and this will further be described later. A second scanning mirror 11 is movable at one half of the velocity of the first scanning mirror 7 in the same direction as the mirror 7, and during the scanning, it maintains constant the length of the optical path from the original 4 to a lens 12, thereby maintaining an image forming relation. The light passed via the first and second scanning mirrors 7 and 11 passes through the lens 12 and via fixed mirrors 13, 14 and further through a diaphragm 15 and is imaged on a photosensitive drum 16. The diaphragm 15 controls the slit width and may further have the function of more intercepting the central portion of the light beam than the marginal portion thereof to compensate for the cos 4 multiplication rule of the lens 12 to uniformize the illumination distribution in the lengthwise direction of the slit. A white member 9 comprising a band-like, white-painted sheet is fixedly disposed obliquely with respect to the original 4 and in the optical path from the auxiliary mirror 8 at the scanning starting end side to the slit portion. An original cover 4' covers the original 4 so that the illumination light does not pass to the operator's eyes during the copying.

Figure 4A:
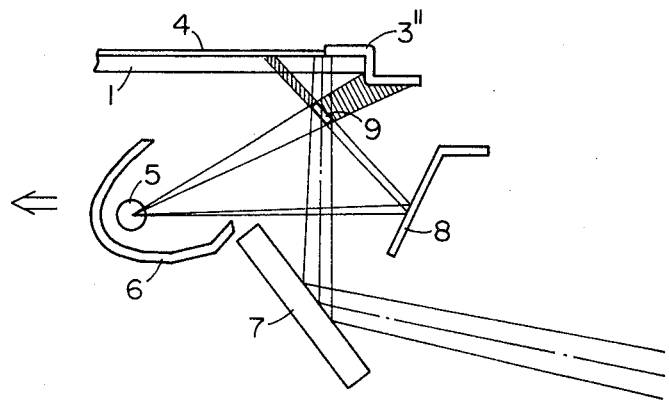
FIGS. 4A, 4B and 4C illustrate the control of the amount of exposure at the slit exposure scanning starting end side.

Reference is now had to FIG. 4 to describe the control of the amount of exposure at the slit exposure scanning starting end side. FIG. 4A shows the case where the image forming principal light ray is at the position of the white member 9, namely, the condition in which the slit exposure scanning is started. The image forming principal light ray is intercepted by the white member 9 and instead, the direct light from the light source 5 is reflected by the surface of the white member 9 and a predetermined quantity of light is projected upon the photosensitive drum 16, and a black line produced by the shadow of the boundary portion between the original stopping reference member 3" and the original 4 is not projected upon the photosensitive drum 16. If the white member 9 is placed in spaced apart relation with the original supporting surface, it will be defocused and projected upon the photosensitive member and so, any dust or the like adhering to the white member 9 will very little affect the same. The white member 9 may also be fixedly disposed near the original carriage and is set at a predetermined position. The white member 9 has the end portion thereof, for example, in the lengthwise direction of the slit secured by a screw or the like. In FIG. 4A, the shadows of the white member 9 by the light beams from those sides of the white member 9 which are adjacent to the light source 5 and the auxiliary mirror 8 are produced in the other area than the effective slit exposure area and offer no problem. After a blank space has thus been provided at the leading end of copy paper, the original 4 is projected upon the photosensitive drum 16 by the lens 12 during the ordinary slit exposure scanning.

Figure 4B:
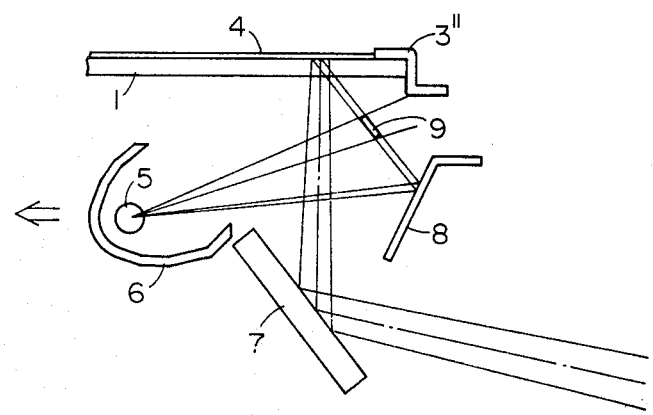

FIG. 4B shows the conditions at a point of time whereat the image forming principal light ray is deviated a little from the boundary portion between the original stopping reference member 3" and the original 4. The shadow of the white member 9 by the light beam from the auxiliary mirror 8 passes across the effective slit exposure area, but since the white member 9 is a thin plate and is inclinedly installed so as to be parallel to the direction of the reflected light from the auxiliary mirror 8, the shadow of the white member 9 is very narrow in width and the rate it occupies in the effective slit exposure area is very small. Considering the image 5' of the light source 5 by the auxiliary mirror 8, the white member 9 is obliquely fixedly disposed in the image forming principal optical path from the boundary portion between the original stopping reference member 3" and the original 4 when the slit exposure scanning is started and moreover, parallel to the direction passing through the boundary portion between the original stopping reference member 3" and the original 4 at this time and the image 5'.

If the white member 9 is disposed in spaced apart relationship with the original 4, the shadow of the white member will become more or less large in size, but the speed at which the shadow crosses the slit area will become higher and thus, the shadow will cross the slit area for a very short time in the direction opposite to the scanning direction (the direction of arrow), and there will be no substantial problem with respect to the original exposure. The white member 9 is fixedly disposed at a predetermined position by taking into account the speed at which the shadow crosses.

Figure 4C:
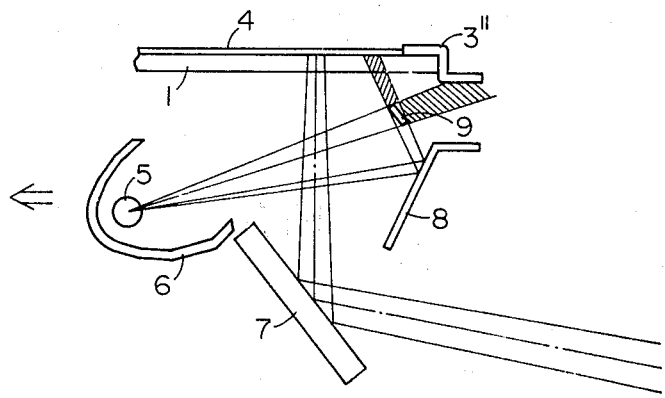

FIG. 4C shows the conditions in which the image forming principal light ray is further deviated from the boundary portion between the original stopping reference member 3" and the original 4. At this point of time, the shadow of the white member 9 affects the slit area in no way. Incidentally, where it is desired that the blank space at the leading end portion of copy paper be larger than that provided by the white member 9, the surface of the original stopping reference member 3" which is in contact with the original carriage glass may be whitened as by white painting.

FIG. 5 relates to the control of the amount of exposure at the slit exposure scanning terminating end side. Generally, during reduced magnification copying, the image formation area may sometimes become smaller than the size of copy paper and a blank portion may be created at the slit exposure scanning terminating end side and it is therefore necessary to prevent such blank portion from blackening on copy paper. This may be prevented by fixedly disposing a white member 9' in the image forming optical path from the end of the rear end glass keep member 10 and using the white back side of the original cover and the white-painted back side of the rear end glass keep member. The white member 9' is of a small cross-sectional area such as to prevent the shadows by both the direct light from the light source 5 and the reflected light from the auxiliary mirror 8 from being greatly projected upon the slit exposure area, and is set at an average angle of incidence of the rays incident on the slit area. No shadow is created on the rear end of the original by the light source 5, and the area from the rear end of the original to the rear end glass keep member 10 is prevented from blackening on the copy paper by the whitened back side of the original cover 4' and the subsequent area is prevented from blackening on the copy paper by the whitened back side of the rear end glass keep plate 10.

However, since the reflected light from the auxiliary mirror 8 is usually weaker than the direct light from the light source 5, the direct light from the light source 5 is not projected upon the end portion of the rear end glass keep member 10 and a black line is created on the copy paper by the shadow created by the thickness of the rear end glass keep member 10. Normally, during copying, the original cover 4' covers the original surface so that the light from the light source does not reach the operator's eyes, and the back side of the original cover is whitened, but even this cannot completely prevent the black line from being created by the thickness of the fore end portion of the rear end glass keep member 10. Also, if the so-called blank exposure is used, the sharpness of the boundary portion from the image formation area to the non-image formation area, namely, the blank space, will become poor. This is a problem occurring particularly when it is desired to copy an original larger than the original supporting surface, for example, a newspaper or the like, over a predetermined image formation area and completely secure the blank space for the remaining area other than the predetermined image formation area. This problem is solved by using a white member 9' to whiten the back side of the rear end glass keep member 10 which is long in the scanning direction. Description will hereinafter be made in accordance with the flow of the slit exposure scanning.

Figure 5A:
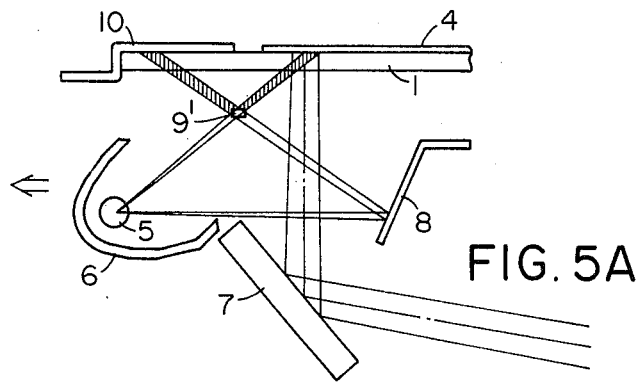
FIGS. 5A, 5B, 5C and 5D illustrate the control of the amount of exposure at the slit exposure scanning terminating end side.
Figure 5B:
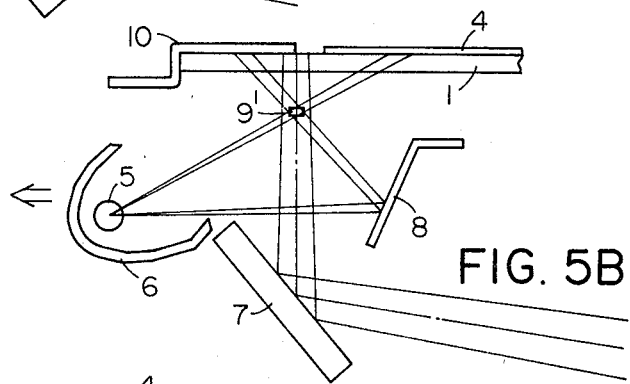

In FIG. 5A, when the first scanning mirror 7, the main mirror 6 and the auxiliary mirror 8 come up to the rear end of the original 4, the shadow of the band-like white member 9' by the light from the light source 5 crosses the effective slit exposure area, but since the white member 9' is very narrow in width and moreover is spaced apart from the original supporting surface, the speed at which the shadow crosses the effective slit exposure area is high and the time required for the shadow to pass such area is short and therefore, as in the previously described embodiment, the shadow hardly affects the amount of exposure of the projected image of the original when the shadow has crossed said area. When the first mirror 7 is further moved and comes to the position of FIG. 5B, the end portion of the glass keep member 10 is not projected as in the case of FIG. 4A, but a defocused image of the white member 9 is projected to thereby prevent black lines from appearing on the rear end portion of copy paper. When the first mirror 7 is further moved to the position of FIG. 5C, there is brought about a state equivalent to FIG. 5A and the amount of exposure is affected very little. This is because the size of the white member 9' itself is small and the white member is set substantially parallel to the original carriage. It is not desirable that the white member at the slit exposure scanning terminating end side be disposed obliquely with respect to the original surface as is the white member at the slit exposure scanning starting end side. The reason is that the shadow of the white member by the lights from the light source and the main mirror or the auxiliary mirror would become large.

Figure 5C:
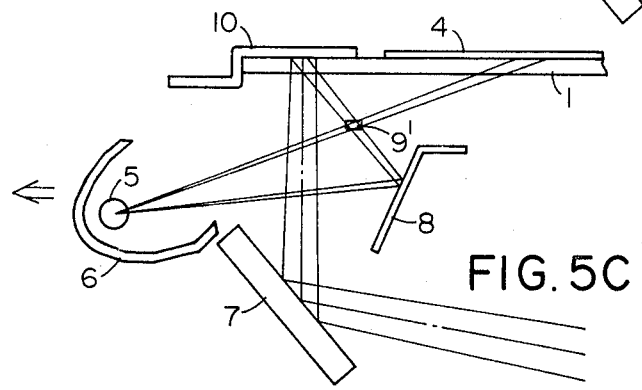
Figure 5D:
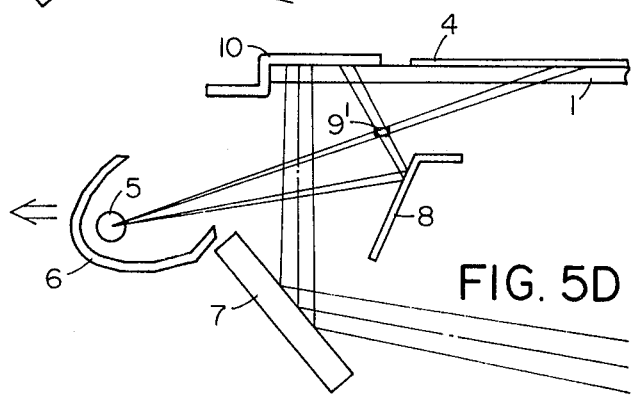
Figure 6A:
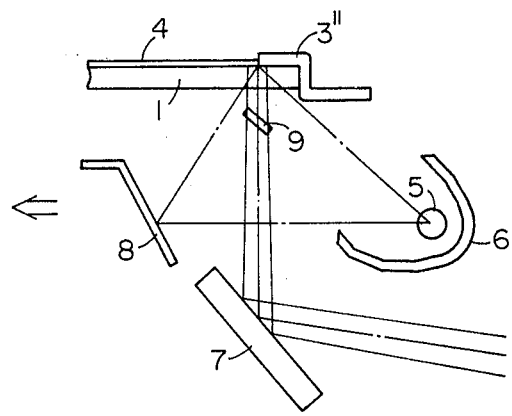
FIGS. 6A and 6B show another embodiment at the slit exposure scanning starting end side.
Figure 6B:
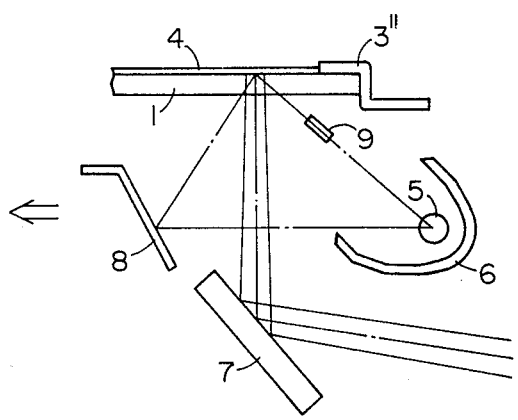

When the first scanning mirror comes to the position of FIG. 5D past the position of FIG. 5C, the influence of the shadow of the white member 9' is entirely eliminated. That surface of the rear end glass keep member 10 which is in contact with the original carriage glass 1 is white-painted and a white shadow is projected upon the photosensitive drum 16. The great length of the rear end glass keep member 10 compensates for the slit width becoming great during reduced magnification copying. If, at this point of time, the movement of the first scanning mirror 7, the light source 5, the main mirror 6 and the auxiliary mirror 8 is moved and the light source 5 is left turned on for a suitable time, a necessary white area will be projected upon the surface of the photosensitive drum 16. Although description has so far been made with respect to an illuminating system in which the light source lies at the left-hand side relative to the slit portion, it is apparent that what has been described above is equally applicable to an illuminating system in which the light source lies symmetrically at the right-hand side relative to the slit portion. Also, the scanning starting end may be equivalently replaced by the scanning terminating end. While the present invention has hitherto been described with respect to a slit exposure scanning type copying machine in which the first scanning mirror and the second scanning mirror scan the original at a velocity ratio of 2:1 and the original illuminating light source is also moved with the first scanning mirror, the invention is not restricted to the illustrated embodiments but is applicable to all of the slit exposure scanning type copying machines. As already mentioned, the invention is applied to the so-called variable magnification copying machines in which the copying magnification can be changed. What has been described as the white member is not limited to white-painted members, but includes all means corresponding thereto for transmitting a predetermined quantity of light to the photosensitive member.

Thus, according to the present invention, there can be provided a both-side illumination original exposure device which can reliably eliminate the black lines which would otherwise be created on copy paper from near the end of the original stopping reference member or the original carriage keep member, by a simple construction with the scanning direction taken into account.

What we claim is:

1. An original exposure device comprising:
   an original carriage for supporting an original;
   an original stopping reference member provided at one end of said original carriage;
   a slit exposure scanning system for illuminating a slit area on an original, said illuminating system having a light source and an auxiliary mirror opposed to said light source with the image forming main optical path from said slit area interposed therebetween, said scanning system being movable relative to said original carriage; and a white member fixedly disposed in the image forming main optical path at a boundary portion between said original stopping reference member and one end of the original, said white member being disposed substantially in parallel with a light beam projected from said light source and reflected by said auxiliary mirror toward said slit area, and being adapted to intercept the image forming light beam from said boundary portion and effectively direct part of the illuminating light beam of said slit exposure scanning illuminating system to an image plane.

2. An original exposure device according to claim 1, wherein said white member is a white-painted, band-like thin plate.

3. An original exposure device according to claim 1 or 2, wherein the back side of said original stopping reference member which is adjacent to said original carriage is white-painted.

4. An original exposure device comprising:
an original carriage for supporting an original;
an original stopping reference member provided at one end of said original carriage;
a slit exposure scanning system for illuminating a slit area on an original, said illuminating system having at least a light source and an auxiliary mirror opposed to said light source with the image forming main optical path from said slit area interposed therebetween, said illuminating system being movable relative to said original carriage; and
a white member fixedly disposed in the image forming main optical path at a boundary portion between said original stopping reference member and one end of the original, said white member being disposed substantially in parallel with a light beam from said light source and reflected by said auxiliary mirror toward said slit area, and said white member being adapted to intercept the image forming light beam from said boundary portion and effectively direct part of the illuminating light beam of said slit exposure scanning illuminating system to an image plane through an image forming element.

5. An original exposure device according to claim 4, wherein said white member is a white-painted, band-like thin plate.

6. An original exposure device according to claim 4 or 5, wherein the back side of said original stopping reference member is white-painted at the portion which is adjacent to said original carriage.

7. An original exposure device comprising:
an original carriage for supporting an original;
an original stopping reference member provided at one end of said original carriage;
an glass keep member provided at the other end of said original carriage;
an original carriage cover placed on said original carriage and having a white back side;
a slit exposure scanning system for illuminating a slit area on an original, said illuminating system having at least a light source and an auxiliary mirror opposed to said light source with the image forming main optical path from said slit area interposed therebetween, said illuminating system being movable relative to said original carriage;
a first white member fixedly disposed in the image forming optical path at a boundary portion between said original stopping reference member and one end of the original, said white member being disposed substantially in parallel with a light beam from said light source and reflected by said auxiliary mirror toward said slit area, and said first white member being adapted to intercept the image forming light beam from said boundary portion and effectively direct part of the illuminating light beam of said slit exposure scanning illuminating system to an image plane; and
a second white member fixedly disposed in the image forming main optical path from the end of said glass keep member and aligned corresponding to the average angle of incidence of the illuminating light beam incident on said slit area, said second white member being adapted to intercept the image forming light beam from said end of said glass keep member and effectively direct part of the illuminating light beam of said slit exposure scanning illuminating system to the image plane.

8. An original exposure device according to claim 7, wherein said first and second white members are white-painted, band-like thin plates.

9. An original exposure device according to claim 7 or 8, wherein the back sides of said original stopping reference member and said original carriage keep member are adjacent to said original carriage and white-painted.

10. An original exposure device comprising:
an original carriage for supporting an original;
an original stopping reference member provided at one end of said original carriage;
means providing first and second light beams with the image forming main optical path interposed therebetween, wherein said first and second light beams slit-illuminate the same portion on the original, and are movable along said original carriage to slit-scan the original; and
a member for intercepting the image forming light beam from a boundary portion between the original and said original stopping reference member and for effectively directing light from said second light beam toward an image plane, when said slit-illuminating means is positioned for illuminating said boundary portion, said member being disposed substantially in parallel with light from said first light beam and directed toward a slit area on the original to be illuminated.

11. An original exposure device according to claim 10, wherein said first light beam is a mirror image of said second light beam.

* * * * *